July 5, 1960 J. M. HANERT 2,943,527
ADJUSTABLE TUNE PRODUCING INSTRUMENTALITY
Filed Sept. 16, 1957 3 Sheets-Sheet 1

Inventor
John M. Hanert
By Benjamin F. Nupper
Atty.

July 5, 1960
J. M. HANERT
2,943,527
ADJUSTABLE TUNE PRODUCING INSTRUMENTALITY
Filed Sept. 16, 1957
3 Sheets-Sheet 2
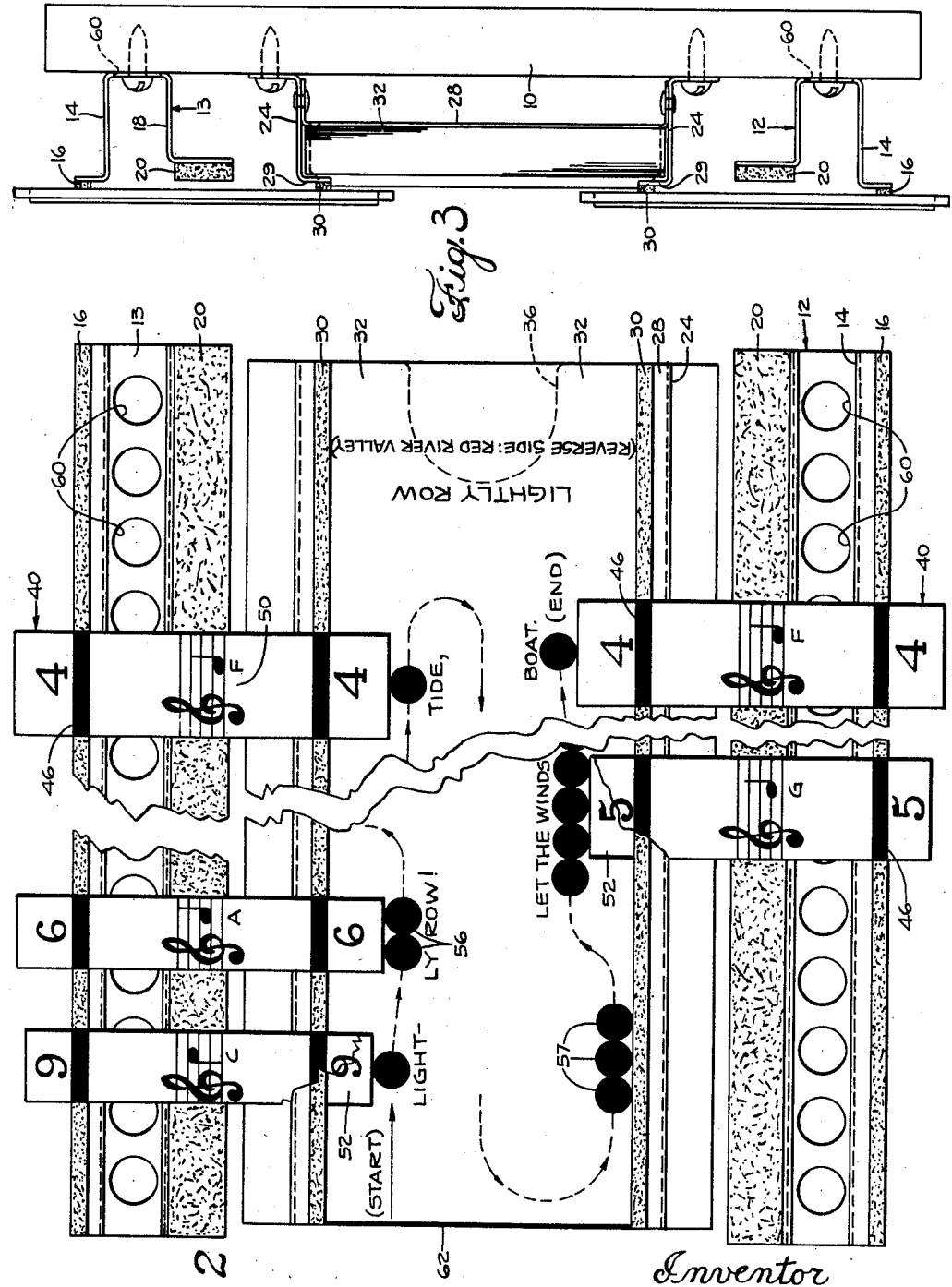
Inventor
John M. Hanert
By Benjamin F. Wupper Atty.

July 5, 1960
J. M. HANERT
2,943,527
ADJUSTABLE TUNE PRODUCING INSTRUMENTALITY
Filed Sept. 16, 1957
3 Sheets-Sheet 3
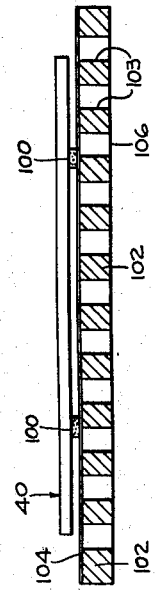
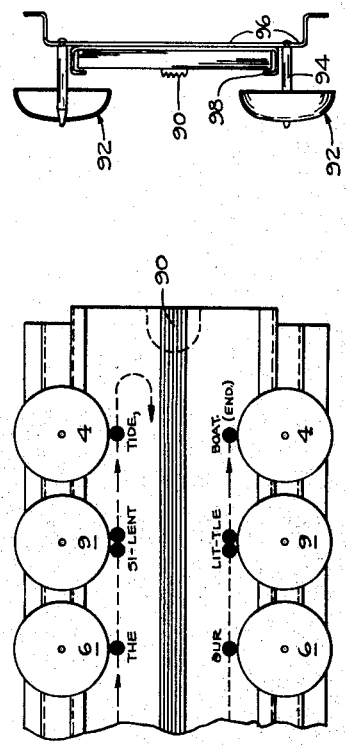
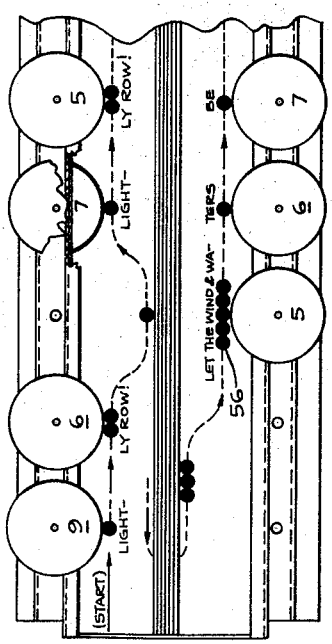
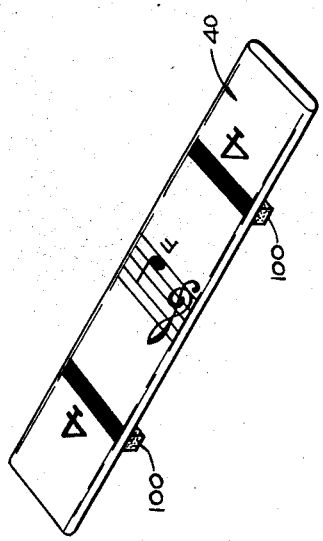
Inventor
John M. Hanert
By Benjamin H. Nupper
Atty.

United States Patent Office 2,943,527
Patented July 5, 1960

2,943,527
ADJUSTABLE TUNE PRODUCING INSTRUMENTALITY

John M. Hanert, 386 Stratford Road, Des Plaines, Ill.

Filed Sept. 16, 1957, Ser. No. 684,045

11 Claims. (Cl. 84—403)

My invention relates to a novel music-producing apparatus which requires virtually no special study or time consuming practice as do other standard instruments, such as the glockenspiel or xylophone.

Of the greatest importance is the fact that there is no musical notation to read, such as the various note positions on the usual musical staff. Furthermore, the player need have no knowledge of note time values or "rest" values. In fact, even a very small child readily can play the instrument without making the slightest error, either in the melodic sequence of notes or the time values of the notes. The player readily attains an excellent performance characterized by a high degree of rhythmic perfection and musical expression. The player, like the conductor of an orchestra, is completely freed of all of the technical difficulties related to the playing of any of the standard instruments, and can devote his whole energy to the artistic elements of the musical rendition, such as accent, nuance, and tempo. Under these remarkable conditions of freedom, the player rapidly acquires a high degree of interpretive musicianship. This instrument not only permits him to play solos, but also enables him to play in groups or orchestras.

With all conventional musical instruments, a person is barred from the enjoyment of "making his own music" until he has first overcome these two long and tedious problems:

(1) Learning to read notes on the sheet music, as well as learning to find the corresponding keys on the particular musical instruments being studied;

(2) Learning to play "in time," that is, learning to read the rests on the sheet music as well as learning to "count out" the notes.

Thus the invention relates generally to a xylophone-like instrument in which vibratory tone producing instrumentalities may be arranged in a predetermined order to produce a tune when the player strikes the tone producers in regular rhythmic sequence.

It is a further object to provide a musical instrument generally of the xylophone type, which may be played by persons lacking substantial experience or knowledge in the production of music, to produce percussive musical tunes with a minimum of practice.

A further object is to provide a musical instrument having percussive musical vibratory tone producers which may be arranged in a variety of desired sequences so that by successively striking the tone producers the musical tune may be produced by a person having a minimum of musical experience and training.

A further object is to provide a musical instrument, and score therefor, which indicates to the player the tempo and rest periods of the musical selection to be played.

A further object is to provide a musical instrument similar to the xylophone or the like, in which vibratory tone producing elements are prearranged in a definite sequence in accordance with the indicia on a chart, or score, and in which the player, by following such indicia in the arranged sequence, may render a certain tune by striking the tone producers in regular succession, and with indicia showing the "rest" periods.

A further object is to provide a chart or diagram to be placed adjacent the ends of the vibratory elements, and to indicate in full size the arrangement and sequence of the bars for playing a tune on the chart or diagram.

A further object is to provide an improved xylophone in which the vibratory elements are mounted on substantially parallel rather than convergent supports, and in which the vibratory bars are substantially the same length but are necessarily of different thickness.

A further object is to provide a xylophone-like instrument in which there is a sound absorbent pad adjacent the ends of the bars and which may be struck to indicate rest periods.

A further object is to provide a xylophone-like instrument with not only indications for the location of the bars, but also with indicia to indicate the number of times each bar is to be struck in the course of a rendition of a musical score.

A further object is to provide an improved xylophone-like instrument in which the vibratory bars are marked to indicate the position in which they are to be placed upon a pair of spaced supports to secure the optimum sound output, such markings being spaced approximately a distance equal to ⅔ of the length of the bar at each end.

Other objects will appear from the following description, reference being had to the accompanying drawings, in which:

Fig. 2 is a full scale plan view of portions of the musical instrument shown in Fig. 1;

Fig. 3 is an end elevational view of the instrument shown in Fig. 2;

Fig. 5 is a plan view of a modified form of the invention, showing the vibrators in the form of bells;

Fig. 6 is an end elevational view of the modified form of the invention shown in Fig. 5;

Fig. 7 is a perspective view of a second modified form of the invention, showing a representative free-free bar having adhesive attached felt-like supports; and Fig. 8 is a sectional view, showing the manner in which the free-free bars of Fig. 7 may be supported.

The invention is for the fundamental purpose of teaching adults, as well as children, the fundamentals of musical notation and composition. In addition to providing a simple musical toy which is useful for the rendition of musical scores, by the use of the instrument of this invention a person having very little musical skill or experience is enabled to produce a xylophone-like rendition of a musical score without the necessity of requiring the player to attain the musical proficiency or technique of a player of a xylophone, but in addition, may be played in the manner of a xylophone.

The instrument of the invention comprises a large number of vibratory tone producing instrumentalities and means by which they may be selectively arranged upon a support in a desired sequence to produce a musical tune when they are struck in sequence, and also to indicate to the player the sequence in which the vibrators are to be placed upon the support so that by striking them in sequence the musical tune may be produced. Furthermore, the invention provides means or indicia to inform the player of the arrangement in which the vibrators are to be placed upon the support, in order that a predetermined musical tune may be played when the vibrators are struck in regular sequence by a hammer or the like.

The invention also includes the construction of an instrument in which vibrators may be placed upon a suitable support in the arrangement of the bars of a xylophone or marimba, and then played in the manner in which such instruments are played.

The tuned vibrators may be in the form of wooden or metallic bars mounted for free-free vibration, or may be in the form of semi-hemispherical bells, or other comparable vibratory elements in which vibration may be excited by striking with a hammer, and in which the vibration decays with a percussion pattern.

Figure 1:
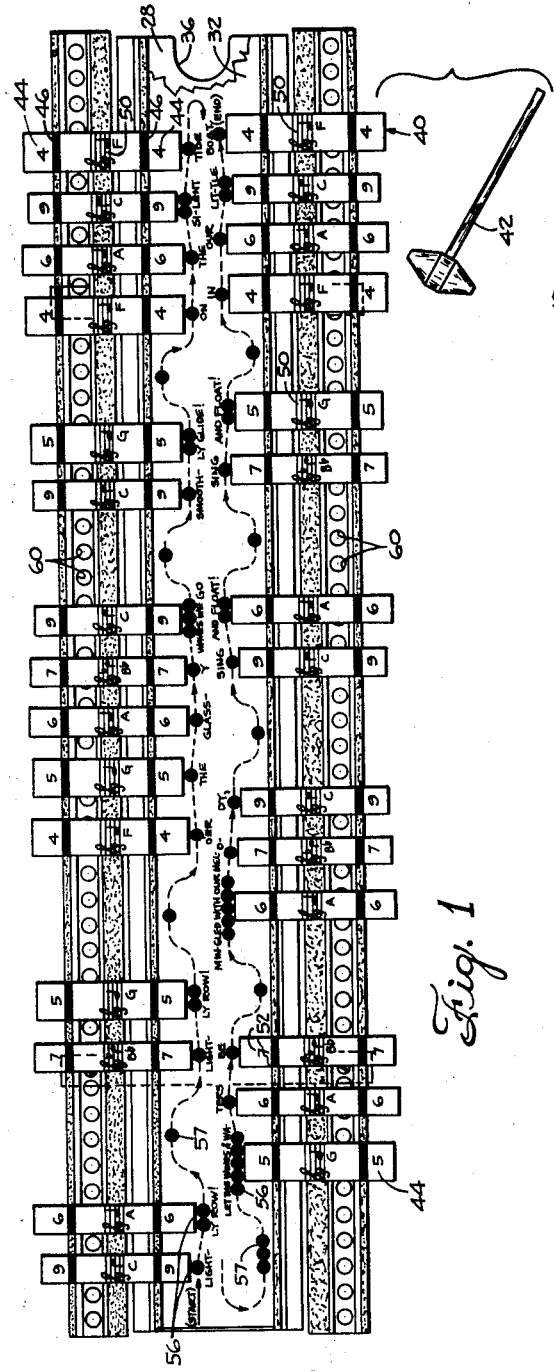
Fig. 1 is a plan view of a preferred form of the invention, showing free-free bars as the vibratory tone producers, arranged upon supports in predetermined sequence in conformity with indicia on a chart, together with the hammer used to strike the free-free bars, shown in a reduced scale.

More specifically, referring to Figs. 1, 2, and 3, the preferred embodiment of the invention consists of a pair of cross pieces 10 of wood or the like (Fig. 3) to which are attached similar supports or rails 12 and 13, each having a wide web 14, with a flange at its upper end to which a felt strip 16 is cemented, and a narrow web 18 to which a strip 20 of felt or the like is cemented. In addition, a pair of generally Z-shaped members 24 are secured to the cross pieces 10 and have a horizontal music chart support sheet 28 riveted thereto. The Z-shaped members 24 have their upper end flanges 29 mutually opposed and have strips 30 of felt or the like cemented thereto. The music strip support sheet 28, together with the flange 29 on the Z-shaped members 24, form a guide for holding one or more music charts, score sheets, or strips 32. The music support sheet 28 is provided with a finger receiving open end slot 36 to facilitate insertion and removal of the musical score charts 32.

A plurality of free-free bars, designated generally by the reference character 40, rest upon the strips 16 and 30, being arranged so that when struck in regular sequence a predetermined tune will be sounded. The sounding is accomplished by striking the free-free bars with a suitable, relatively hard, rubber headed hammer 42 (Fig. 1). These free-free bar vibrators are suitably marked with numerical indicia 44 to facilitate their withdrawal, and placement in a suitable container having pockets or the like, likewise numbered for their reception. These numerical indicia are placed at both ends of the free-free bars 40 so that they will correspond to markings on the musical tone charts 32, whether the bars are placed on the upper or lower pair of rails 16—30.

The free-free bars 40 are of substantially the same length and must necessarily, therefore, be of different thickness, in order that they may produce the desired pitch of tone. It will be noted particularly from the lower portion of Fig. 4, that the bars are numbered to indicate successive notes of the diatonic scale with the addition of bar number 7 for the B♭ tone. It will also be clear from said figure that the bars for the lower pitched notes are generally wider than those for the higher notes. This is for the purpose of securing a greater sound radiation area for the lower frequencies relative to the higher frequencies, so that the bars, when struck with equal hammer blows, will produce sounds of generally equal intensity. By making the bars as narrow as practical, while still being efficient sound radiators, the overall length of the instrument is maintained at a minimum. To facilitate the placement of the free-free bars 40 on the supporting strips 16 and 30, they are provided with marks 46 to indicate the approximate nodal points of vibration which should, of course, correspond to the position in which these bars are placed on the supports 16 and 30 to insure maximum intensity of the tones produced when the bars are struck. In addition, the free-free bars 40 have indicia comprising a treble clef staff signature and note designation 50 corresponding to the pitch which the bar produces upon being struck. The music tune charts 32, which are selectively inserted in the channel provided by the support 28 and flanges 29 of the Z-shaped members 24, comprise indicia 44 or 52 to inform the player of the particular free-free bar 40 which is to be placed in a position overlying the indicia. These indicia may consist of the numbers (in Fig. 1) from 4 to 9 with one marking corresponding to the end portion of the free-free bar 40 which should be placed above such indicia.

To facilitate recognition of the different bars, they preferably have different lithographed colors applied thereto, and such coloring may also be applied to the chart 32 so that even a young child, unacquainted with the numerical or musical designation imprinted or lithographed on the bars, may readily arrange them in accordance with the pattern prescribed by the strip chart 32, and rapidly pick up the bars in re-sorting them. Such variegated coloring of the bars of different pitches also adds to the visual sales appeal of the instrument.

It has been found that a relatively small number of vibratory elements is required for the production of nearly all the simple melodies, especially if indicia on the musical charts 32 include indications that a vibrator is to be struck a number of times in succession. For instance, in Fig. 1 the second bar in the upper row has two dots 56 beneath the end of the bar, indicating that this bar should be struck twice. Similarly, in the first bar in the lower row, Fig. 5, the chart indicates by five dots 56 that this bar should be struck five times in succession. Thus, the number of vibrators required for the playing of nearly all simple melodies adds up to about 85, namely, for C (1046.5 c.p.s.) 6; for the higher semitone D♭, 1; successively for D, 6; for E♭, 1; for E, 10; for F, 11; for F♯, 1; for G, 12; for A♭, 1; for A, 11; for B♭, 7; for B, 4; for C (2093 c.p.s.) 7, for next higher octave notes D♭, 1; for D, 3; for E♭, 1; for E, 1; and for F, 1.

It will be understood that the vibrators are made of slightly different widths and thicknesses so that their overall lengths and acoustic loudness will be approximately the same. Thus, generally, a few lower frequency vibrators will be wider and thicker than the higher frequency vibrators, and as a correlary, the higher frequency vibrators will be narrow and of lesser thickness. The vibrators could be made of the same length by successively varying their thickness, but to make use of cold rolled steel of commercially available gauges, their length is somewhat nonuniform to compensate for the fact that cold rolled steel sheets are not commercially available in more precise variations of thickness and width. Thus, for economy sake, the lengths of the vibrator bars differ somewhat.

Vibrators for the notes D♭, E♭, F♯, and G♯, are not particularly required for the instrument as shown and described with reference to Figs. 1, 2, and 3, but, as will hereinafter appear, are very desirable for the modification shown in Fig. 4.

Thus, to arrange the instrument for the playing of a particular tune scored on the tune chart 32, the prospective player merely selects from a supply of free-free bars those of the numbers (colors, or musical staff designations) corresponding to the indicia 52 upon the tune chart 32, placing their ends directly above the indicia 52, with their markings 46 above the supporting strips 16 and 30.

As above indicated, the tune charts 32 also include dots 56 which indicate to the player the number of times that each of the bars is to be struck with the hammer 42, and also dots 57 which indicate one or more rest periods in the music to be rendered. In addition, the tune chart 32 may have imprinted thereon the lyrics of the tune to be rendered, as well as the name of the tune at the right-hand end of the chart (Fig. 2), so as to facilitate selection of the desired tune from a number of tunes which are recorded on the pack of tune charts 32.

To assure that the free-free vibrators 32 will not have the intensity of their output diminished by acoustic damping, and thus improve the acoustic output, the horizontal bottom portions of the members 13 are provided with a series of closely spaced openings 60, such openings preventing damping of the bars or vibrators due to acoustic coupling between the vibratory bars and the surface upon which the instrument is placed.

The supporting means for the tune indicating strips or charts includes an upwardly extending flange 62 at the left-hand end of the support member 28 to limit the extent to which the tune sheets may be inserted.

The strips 20 are provided so as to be struck by the player one or more times, as indicated by the dots 57, to assure the proper length of rest periods. By this means the player may strike in regular cadence so that rest periods of proper duration will be introduced as required by the score indicated on the chart. Thus, the player may operate the hammer in regular uniform cadence and yet interpose, where required, the proper rest periods. Thus, the rendition of a tune in proper tempo will be facilitated and the player will gain experience in the rendition of a selection with the proper tempo.

If desired, the strips 20, instead of being made of a soft material incapable, when struck, of producing a sound of perceptible intensity may be made of a material which, when struck, will produce a sound (noise) of indefinable pitch, preferably of lower intensity than that of the tones produced by the vibrators, and thus add a further rhythm effect to the music produced. On the other hand, the instrument may be played without striking the strips 20 during the rest period, but instead swing the hammer toward, but without contacting, either the strip 20 or any of the vibrators 40.

The player of the instrument, in playing a tune represented on one of the tune charts 32, taps the bars 40 in succession, commencing with the left-hand end of the upper row and completing the tune by tapping the bars of the lower row, from left to right. The player usually will, if he desires, tap the strips 20 intermediate some of the notes, as indicated by the marking dots 57, to indicate rest periods. By either tapping, or by making a motion suggestive of a tap, the player's ability to introduce accurate rhythm is greatly increased, just as many musicians keep time by tapping with the toes or heel.

Thus, after setting up the bars 40 in the positions indicated by the selected tune chart 32, the player need merely, in regular time sequence, strike the bars 40 from left to right first on the upper row and then on the lower row of bars, and tapping between the bars for the rest periods, as indicated by the indicia 57. A short rest period is indicated on the tune chart 32 by a single dot, while longer rest periods are indicated by two or more rest period indicating dots 57 on the tune chart 32, so that the music, as it is rendered, will include the rests indicated on the chart.

Figure 4:
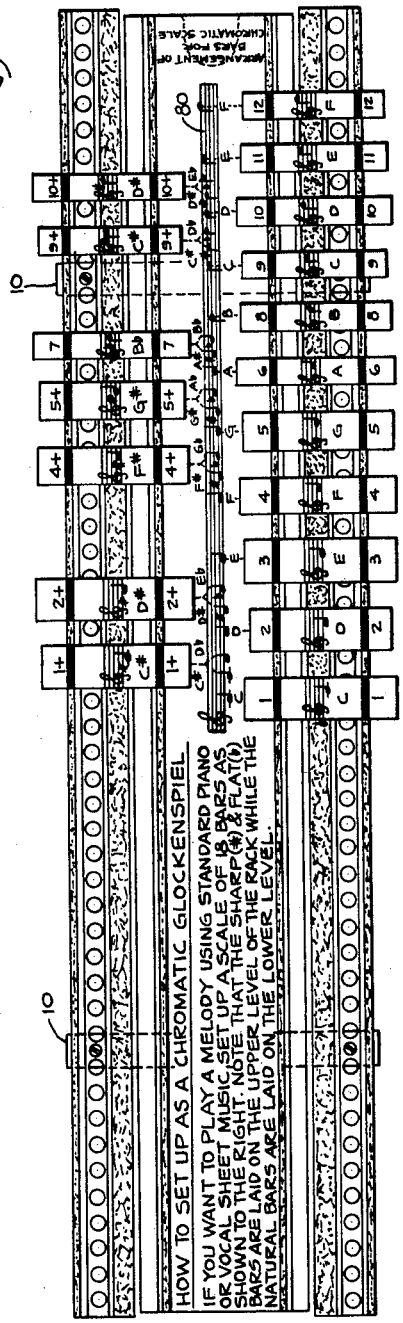
Fig. 4 is a plan view of the instrument, with the free-free bars arranged in the manner of a xylophone, shown in reduced scale.

The bars or vibrators may be placed in the conventional sequence of the xylophone, as illustrated in Fig. 4. The same equipment for supporting the bars as previously described is utilized, although due to the limited number of bars required only approximately half of the length of the supports is necessary to be utilized.

It is believed that in view of the description of Figs. 1–3, Fig. 4 is substantially self-explanatory, it being noted, however, that the bars representing sharped or flatted notes are placed intermediate (in longitudinal arrangement) the bars corresponding to the natural pitches.

In utilizing the apparatus in the conventional manner of the xylophone, the chart 32 preferably is provided with conventional musical score indications of the pitches of the bars so that the reading of the conventional musical score will be facilitated by the pupil playing the instrument. In playing the instrument shown in Fig. 4, it will usually be preferable to provide two hammers 42 so that the rapid rendition of the selections may be facilitated, and so that the pupil or student may rapidly acquire the ability to play the instrument ambidextrously.

The arrangement shown in Fig. 4 differs substantially from a conventional xylophone in that all of the bars are of substantially the same length. This is of advantage in playing the instrument, but also has the further advantage that the instrument may be packed in a container of substantially rectangular cross section, making it more easy to ship, transport, and carry from place to place. The reference characters applied to Fig. 4 are the same as those applied to corresponding parts previously described with reference to Figs. 1–3, and it is therefore believed that further detailed description of Fig. 4 is not necessary, except to point out that the musical score 80 is depicted on the chart 32 in the conventional manner. The instrument is, of course, played in the conventional manner of a xylophone, with either one or two hammers.

Fig. 5 discloses a variation of the instrument, in which the vibratory elements, instead of being in the form of bars, are in the form of bells. The chart for indicating the number of times each bell is to be struck, and for indicating the rest periods, is substantially the same as that previously described, and the support for the charts is preferably substantially the same, except that it is desirable to provide a corrugated center board 90 of wood, plastic, or the like, which may, if desired, be struck to produce a "Chinese block" effect to indicate the rest periods.

As will be clear from Figs. 5 and 6, the various bells 92 are suitably supported on vertical studs 94 which are riveted to a base plate 96. A chart guide 98 of suitable construction is secured to the base 96. In playing the instrument shown in Figs. 5 and 6, glockenspiel effects may readily be obtained. The hammer or hammers employed in playing this glockenspiel type instrument preferably have metallic heads so as to enhance the high harmonic content of the tones produced.

A further modification is shown in Figs. 7 and 8, in which the vibratory bar 40 has cemented or otherwise secured thereto a pair of sponge rubber or similar bars 100, to the bottoms thereof at their nodal points. These bars may then be placed in sequence, as shown in Fig. 1, or in the manner of a xylophone shown in Fig. 4, upon a multi-perforated supporting board 102 upon the upper face of which a thin paper sheet 104 is secured. The thin paper, or tissue paper, sheet permits vibrations to pass through the perforations 103 in the support 102, so that damping of vibration will be reduced considerably. Another thin paper sheet 106 may be cemented to the bottom of the perforated support 102, but this is not essential.

The support 102 is preferably mounted on a table or other similar means, being suitably raised therefrom a sufficient distance to permit adequate propagation of the sound waves produced by the vibrators 40. The construction of Figs. 7 and 8, whether incorporated in the form shown in Figs. 1, 2, and 3, or assembled in the form shown in Fig. 4, provides a very simple and efficient means for producing xylophone-like tones.

In general, in the use of any of these several forms of invention disclosed, it is possible for a person, not necessarily trained in the art of musical production, to attain a high degree of proficiency in the rendition of musical tunes, without spending undue time in study and practice. However, the invention disclosed also has the possibility of originality in the arrangement of the bars, to provide an experienced musician with an instrument by which he may express his musical ability in providing novel cadences, nuances, and other musical attributes, to his own and his listeners' enjoyment.

In summary, it may be stated that the invention resides in the concept that vibrators, whether free-free bars, or bells or the like, may be positioned by the embryonic or experienced musician in a predetermined order such, that by striking the vibrators in regular sequence by means of a hammer or the like, a musical tune may be rendered, and the placement of the vibrators is made in accordance with a simple chart indicating the requisite placement.

Furthermore, the invention contemplates the provision of a suitable chart indicating to the player the requisite placement of the vibrators so that when struck sequentially, the rendition of a certain tune will be accomplished.

Ancillary to the foregoing, the chart of the invention indicates the number of times a certain vibrator shall be struck, as well as the number of rest periods between successive notes (whether one, two, or three), so that by striking a "Chinese block" sounder, or merely a felt, low intensity, sound producer, the rest periods may be in proper cadence.

Not to be overlooked, however, is the fact that the vibratory sounders may be located (as in Fig. 4) to provide, in essence, a xylophone in which the sounding bars are of substantially equal length, thereby greatly to facilitate the playing of the instrument as a xylophone. Furthermore, the instrument has the potentialities of a glockenspiel, with either a conventional or predetermined sequence of the bell-like sounders.

That the ramifications of the invention are considerable, it may be considered that as in the disclosure of Figs. 7 and 8, the free-free bars may be supported by strips of felt-like material secured to the bars at their nodal points, so that these bars may be placed upon a suitable chart in sequential horizontal alignment to produce the desired tune. To accomplish this desirable result, it is preferable that the bars 40 (Fig. 8) be of substantially equal length so that they may be placed in substantially horizontal alignment with each bar supported at its nodal points approximately ⅔ of the length of the bar from each end thereof.

As previously noted, there is supplied varying numbers of bars of the same pitch. It is particularly desirable that there be at least four bars or vibratory elements for the sub-mediant the dominant and the sub-dominant which are the notes A, G, and F in the key of C.

In the following claims, the term "tone" is intended to be synonymous with "pitch," which is one dictionary definition thereof.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A musical instrument of the rigid vibrator bar type, a pair of elongated substantially parallel supports, a plurality of vibrator bars on said supports corresponding to notes of a musical scale, each of said vibrator bars having a tone designation thereon, and a tune chart adjacent said supports with designations therealong identifying the notes of the indicated tune, whereby when the proper bars are placed adjacent their respective tone designations and vibrated in sequence they will play the said tune.

2. The combination set forth in claim 1 in which the vibrator bars are of substantially the same length but of different thickness.

3. The combination set forth in claim 1 in which the vibrator bars for the lower pitches are wider than those for the higher pitches.

4. The combination set forth in claim 1 in which the tune chart includes designations of rests and also repetitive notes which are to be played upon the same vibrator bar.

5. The combination set forth in claim 1 in which the supporting means for the vibrator bars includes acoustic damping means engaging the vibrator bars at the nodal points of their fundamental frequency vibration.

6. The combination set forth in claim 1 in which the supporting means are secured to the vibrator bars substantially at the nodal points of their vibration at their fundamental frequencies and in which the supporting means are acoustic damping means.

7. The combination set forth in claim 1 in which the vibrator bars are freely movable and engage their supports solely due to the force of gravity.

8. The combination set forth in claim 1 in which there are a plurality of vibrator bars of the same pitch, at least for the mediant, dominant, and subdominant tones of a musical scale.

9. The combination set forth in claim 1 in which the pitch of the vibrators extends through a range comprising at least the greater portion of an octave.

10. The combination set forth in claim 1 in which the tone designating portion of the vibrators mask the tone designation on the chart when the vibrator bars are properly placed upon the supports and over the chart.

11. The combination set forth in claim 1, in which the higher pitched vibrators are thicker than the lower pitched vibrators.

References Cited in the file of this patent

UNITED STATES PATENTS

| | | |
|---|---|---|
| 498,561 | Meinhold | May 30, 1893 |
| 1,291,202 | Siegel | Jan. 14, 1919 |
| 1,392,766 | Huth | Oct. 4, 1921 |
| 2,020,150 | Ludwig | Nov. 5, 1935 |
| 2,117,345 | Miessner | May 17, 1938 |
| 2,153,725 | Sanders | Apr. 11, 1939 |
| 2,227,227 | Mason | Dec. 31, 1940 |
| 2,265,237 | Klein | Dec. 9, 1941 |

FOREIGN PATENTS

| | | |
|---|---|---|
| 271,960 | Germany | Mar. 21, 1914 |
| 355,932 | Great Britain | Sept. 3, 1931 |
| 411,054 | Great Britain | May 31, 1934 |
| 808,930 | France | Nov. 24, 1936 |
| 99,418 | Sweden | July 16, 1940 |

UNITED STATES PATENT OFFICE

CERTIFICATION OF CORRECTION

Patent No. 2,943,527                                            July 5, 1960

John M. Hanert

It is hereby certified that error appears in the above numbered patent requiring correction and that the said Letters Patent should read as corrected below.

Column 4, line 43, for "thicker" read -- thinner --; line 45, for "lesser" read -- greater --.

Signed and sealed this 18th day of July 1961.

(SEAL)
Attest:

ERNEST W. SWIDER                                          DAVID L. LADD
Attesting Officer                                             Commissioner of Patents